UNITED STATES PATENT OFFICE 2,244,308

UNSATURATED ETHERS

Clarence L. Moyle and Gerald H. Coleman, Midland, Mich., assignors to The Dow Chemical Company, Midland, Mich., a corporation of Michigan No Drawing. Application February 5, 1940, Serial No. 317,316

8 Claims. (Cl. 260—613)

This invention is concerned with a novel group of unsaturated ethers having the following general formula

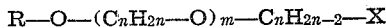

$$R-O-(C_nH_{2n}-O)_m-C_nH_{2n-2}-X$$

wherein R represents an aromatic radical, X represents chlorine, bromine, or hydrogen, $m$ is an integer not greater than 4, and $n$ is an integer from 2 to 6, inclusive. These compounds are for the most part viscous water-white liquids or low-melting solids. They are relatively stable upon exposure to heat and light, somewhat soluble in most common organic solvents and substantially insoluble in water. These ethers have been found useful as modifying agents for synthetic plastics and as insecticidal toxicants.

One method for the preparation of these new compounds consists of reacting a suitable (monohalo-alkyl) (alkenyl) ether or (monohalo-alkyl) (halo-alkenyl) ether with a phenol in the presence of an alkali and water. According to this method, the reactants are mixed together and heated in a closed reactor under autogenous pressure. Temperatures ranging between about 100° and 175° C. are preferred, although somewhat higher or lower temperatures may be employed, depending upon the particular reactants concerned. When equimolecular proportions of the ether, alkali, and phenol are reacted together, the desired compound is produced in good yield. Optimum results are obtained when an excess of the (monohalo-alkyl) (alkenyl) ether is employed in the reaction mixture. The concentration of the alkali present in the reaction zone is not critical, although a solution of from 5 to 30 per cent by weight is generally employed. Following completion of the reaction, the reactor and contents are cooled and the crude product washed with dilute alkali and fractionally distilled to separate out the desired ether compound.

An alternate procedure consists of reacting the sodium salt of an aryloxy-alkanol or aryloxy-polyalkylene-ether-alcohol with an alkenyl or halo-alkenyl-halide. This reaction is conveniently carried out by dispersing substantially equimolecular proportions of the reactants in an inert organic solvent and heating the mixture to its boiling temperature under reflux. Following completion of the reaction, the crude product is washed and fractionally distilled in the usual manner. This procedure has been found adapted to the preparation of those ether compounds wherein the alkenyl or halo-alkenyl radical contains at least three carbon atoms.

The term "alkenyl" as herein employed refers to those unsaturated aliphatic hydrocarbon radicals containing a single double bond. The expression "halo-alkenyl" refers to such a radical containing a single chlorine or bromine substituent.

Example 1

117 grams (1.1 mols) of beta-chloroethyl) (vinyl) ether, 105 grams (0.7 mol) of 4-tertiary-butyl phenol, 29.2 grams (0.7 mol) of 96 per cent sodium hydroxide and 68 milliliters of water were mixed together and heated in a closed copper reactor at 150° C. for 8 hours. The resulting crude product was washed with dilute sodium hydroxide solution and fractionally distilled, whereby there was obtained 97.3 grams of beta-(4-tertiary - butyl - phenoxy) - ethyl vinyl ether boiling at 142° to 145° C. at 8 millimeters pressure and having a density of 0.98 at 25°/20° C. This compound was a pale yellow oil having a pleasant aromatic odor.

Example 2

In a similar manner other phenols were reacted with (beta-chloroethyl) (vinyl) ether to obtain:

Beta-(2-chloro-4 - tertiary - butyl - phenoxy)-ethyl vinyl ether as a yellow viscous aromatic oil boiling at 158° C. at 7 millimeters pressure and having a density of 1.09 at 25°/20° C.

Beta-(4-chloro-phenoxy)-ethyl vinyl ether as a colorless oil boiling at 138° C. at 12 millimeters pressure. This oil solidified on standing to form white crystals melting at 48.5°–49.5° C.

Beta-(2-xenoxy)-ethyl vinyl ether as a yellow mobile liquid boiling at 163° to 167° C. at 5.5 millimeters pressure and having a density of 1.094 at 25°/25° C.

Beta-toloxy-ethyl vinyl ether (from technical meta-para-cresol mixture) as a yellow mobile liquid boiling at 120°–123° C. at 6 millimeters pressure and having a density of 1.078 at 25°/25° C.

Beta-(2-cyclohexyl-phenoxy)-ethyl vinyl ether as a pale yellow oil boiling at approximately 160° C. at 5 millimeters pressure and having a density of 1.032 at 25°/25° C.

Beta-(4-xenoxy)-ethyl vinyl ether as a white crystalline compound melting at 73°–76° C.

Example 3

11.5 grams (0.5 mol) of sodium metal and 69 grams (0.5 mol) of a mixture consisting of 85 per cent by weight of beta-phenoxy-ethanol-beta and 15 per cent of gamma-phenoxy propanol were dispersed in 300 milliliters of toluene. This mixture was heated to its boiling temperature under reflux for one hour. 38.3 grams (0.5 mol) of allyl chloride was then added and heating continued at 90°–99° C. for an additional 4 hours. The reaction mixture was then cooled to room temperature, washed with water and fractionally distilled, whereby there was obtained 69 grams of an ether product as an oil boiling at 120° to 123° C. at 10 millimeters pressure and having a specific gravity of 1.040. This product consisted of a mixture of beta-phenoxy-ethyl allyl ether and phenoxy-propyl allyl ether.

*Example 4*

Likewise, 121 grams (0.5) mol of beta-(2,4,6 trichlorophenoxy)-ethanol and 12 grams (0.52 mol) of sodium metal were heated at 92°–97° C. in 200 milliliters of toluene for several hours. 76.5 grams (1 mol) of allyl chloride was then added and the mixture heated to its boiling temperature and under reflux for 8 hours at 65°–82° C. The crude reaction product was washed with water and fractionally distilled, whereby there was obtained beta-(2,4,6-trichlorophenoxy)-ethyl allyl ether as a substantially colorless oil boiling at 170°–171° C. at 10 millimeters pressure and having the specific gravity 1.334 at 25°/25° C.

When the sodium salt of beta-(2-toloxy)-ethanol was reacted with allyl chloride in a similar manner, a beta-(2-toloxy)-ethyl allyl ether product was obtained which boiled at 117°–121° C. at 6 millimeters pressure and had a specific gravity of 1.007 at 25°/25° C.

Beta-(4-chlorophenoxy)-ethyl allyl ether, a water-white oil boiling at 160°–161° C. at 20 millimeters pressure and having the specific gravity 1.165 at 25°/25° C., was obtained from the reaction of allyl chloride with the sodium salt of beta-(4-chloro-phenoxy)-ethanol.

*Example 5*

58.5 grams (0.25 mol) of 4-cyclohexyl-phenoxy-propanol and 6.0 grams (0.26 mol) of sodium metal were heated together in 300 milliliters of toluene to form the sodium salt. 23.0 grams (0.3 mol) of allyl chloride was then added to the mixture and the dispersion heated at temperatures varying between 60° and 80° C. and under reflux for a period of 4 hours. The reaction mixture was then cooled, washed with water, and the toluene solution fractionally distilled, whereby there was obtained 4-cyclohexyl-phenoxy-propyl allyl ether as a mobile oil boiling at 152° to 154° C. at 2 millimeters pressure and having a specific gravity of 0.994 at 25°/25° C.

*Example 6*

2.64 grams (0.115 mol) of sodium metal and 27.3 grams (0.115 mol) of beta-(4-tertiary-butyl-phenoxy)-beta'-hydroxy-diethyl ether were dispersed in 150 milliliters of dry benzene and the mixture heated to a boiling temperature and under reflux for several hours. 10 grams (0.131 mol) of allyl chloride was then added and heating under reflux continued for 1.5 hours. The crude reaction mixture was thereafter cooled to room temperature, washed with 150 milliliters of water, and fractionally distilled. The desired product consisted of 26.18 grams of a beta-(4-tertiary-butyl-phenoxy)-beta'-allyloxy-diethyl ether fraction, a yellow mobile oil boiling at 170° to 178° C. at 6.5 millimeters pressure and having a specific gravity of 1.06 at 25°/20° C.

*Example 7*

In a similar manner the sodium salt from 76 grams (0.5 mol) of beta-(2-toloxy)-ethanol was reacted with 54.5 grams (0.6 mol) of 2-methallyl chloride in 200 milliliters of toluene. The mixture was heated under reflux at temperatures gradually increasing from 98° to 117° C. over a period of 4 hours. The crude reaction mixture was purified in the usual manner to obtain 95.6 grams of beta-(2-toloxy-ethyl)-2-methallyl ether as a colorless oil boiling at 123° to 128° C. at 6 millimeters pressure and having the specific gravity of 0.986 at 25°/25° C.

*Example 8*

76 grams (0.5 mol) of beta-(2-toloxy)-ethanol and 12 grams (0.52 mol) of sodium metal were dispersed in 100 milliliters of toluene and the dispersion heated to a boiling temperature under reflux to form the alcoholate. 66.7 grams (0.6 mol) of 2-chloro-allyl chloride was then added to the mixture and heating was continued at temperatures increasing from 107° to 114° C. and under reflux for 4 hours. Fractional distillation of the crude reaction mixture yielded 75 grams of (beta-2-toloxy-ethyl) (2-chloro-allyl) ether, a product boiling at 128° to 134° C. at 3 millimeters pressure and having a specific gravity of 1.108 at 25°/25° C.

Other compounds which may be prepared substantially as set forth in the preceding examples include the (aryloxy-ethyl) (2-bromo-allyl) ethers, (aryloxy-ethyl) propenyl ethers, (aryloxy-ethyl) butenyl ethers, (aryloxy-ethyl) pentenyl ethers, (aryloxy-ethyl) hexenyl ethers, (aryloxy-ethyl) (2-chloro-butenyl) ethers, (aryloxy-propyl) vinyl ethers, (aryloxy-butyl) vinyl ethers, (aryloxy-pentyl) vinyl ethers, (aryloxy-hexyl) vinyl ethers, beta-aryloxy-beta'-vinyloxy-diethyl ethers, gamma-aryloxy-gamma'-(2-chloro-allyloxy)-dipropyl ethers, beta-aryloxy-beta'-(2-methallyloxy)-ethyl-propyl ethers, beta-(aryloxy-ethoxy)-beta-allyloxy-diethyl ethers, gamma-(aryloxy-propoxy)-gamma'-vinyloxy-dipropyl ethers, beta-(aryloxy-ethoxy)-beta'-(propenyloxy-ethoxy)-diethyl ethers, and the like. Representative of the numerous phenols from which the foregoing derivatives may be prepared are 2,4-dimethyl phenol, 2-methyl-5-isopropyl phenol, 4-benzyl phenol, 2-methoxy phenol, 2,4-dinitro-6-methyl phenol, 4-octadecanyl phenol, 4-allyl phenol, 2-chloro-4-phenyl phenol, 2,4,6-tribromo phenol, pentachloro phenol, 4-iodo phenol, alpha-naphthol, 4-chloro-alpha-naphthol, and tetrahydro-naphthol.

Other modes of applying the principle of our invention may be employed instead of those explained, change being made as regards the method or compounds herein disclosed, provided the compounds stated by any of the following claims be thereby obtained.

We therefore particularly point out and distinctly claim as our invention:

1. A compound having the formula

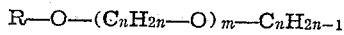

wherein R represents an aromatic radical, $m$ is an integer not greater than 4, and $n$ is an integer from 2 to 6, inclusive.

2. A compound having the formula

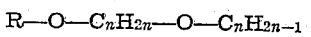

wherein R represents an aromatic radical of the benzene series and $n$ is an integer from 2 to 6, inclusive.

3. A compound having the formula $$R-O-C_2H_4-O-C_nH_{2n-1}$$

wherein R represents an aromatic radical of the benzene series and $n$ is an integer from 2 to 6, inclusive.

4. A compound having the formula $$R-O-(C_nH_{2n}-O)_m-C_nH_{2n-1}$$

wherein R represents an aromatic radical of the benzene series, $m$ is an integer not greater than 4, and $n$ is an integer from 2 to 6, inclusive.

5. A compound having the formula $$R-O-(C_nH_{2n}-O)_mCH=CH_2$$

wherein R represents an aromatic radical of the benzene series, $m$ is an integer not greater than 4, and $n$ is an integer from 2 to 6, inclusive.

6. A compound having the formula $$R-O-(C_nH_{2n}-O)_m-CH_2-CH=CH_2$$

wherein R represents an aromatic radical of the benzene series, $m$ is an integer not greater than 4, and $n$ is an integer from 2 to 6, inclusive.

7. A beta-(aryloxy-ethyl) vinyl ether having the formula $$R-O-C_2H_4-O-CH=CH_2$$

wherein R represents an aromatic radical of the benzene series.

8. A beta-(aryloxy-ethyl) allyl ether having the formula $$R-O-C_2H_4-O-CH_2-CH=CH_2$$

wherein R represents an aromatic radical of the benzene series.

CLARENCE L. MOYLE.
GERALD H. COLEMAN.